Oct. 11, 1932.  M. D. CODY  1,882,065

FRUIT JUICE EXTRACTOR

Original Filed May 26, 1928

Inventor
Marie D. Cody
By J. Preston Sweeker
Attorney

Patented Oct. 11, 1932

1,882,065

UNITED STATES PATENT OFFICE

MARIE D. CODY, OF FROSTPROOF, FLORIDA

FRUIT JUICE EXTRACTOR

Application filed May 26, 1928, Serial No. 280,769. Renewed January 7, 1932.

This invention relates to an improvement in fruit juice extractors.

The object of the invention is to provide for extracting the juice from various kinds of fruits, such as oranges, grapefruit, etc., by inserting a device into the fruit through a side of the skin and sucking on the outer end of this tubular device, so as to extract the juice therethrough.

Various attempts have been made to accomplish this result but they have been based primarily on a forcing of the juice through the device by external pressure instead of by sucking through the tubular member. The latter has distinctive advantages over the former, particularly in the creation of a vacuum at the point where the tubular device enters the skin of the fruit, which prevents the ingress of air and allows the discharge of the fruit juice only through the tubular device, preventing a wasting of the fruit juice.

The present invention is extremely simple in structure and may be made of any suitable material for this purpose at a very small cost. At the same time, it effectively accomplishes the objects desired and in a decidedly better and more economic manner than the various fruit juice extractors which have heretofore been devised.

The numeral 1 indicates the tubular member, preferably so formed or provided with an opening therethrough, having radiating slits or round holes 2 formed in the walls of the tubular member 1 and communicating with the interior opening 3 thereof.

Figure 1:
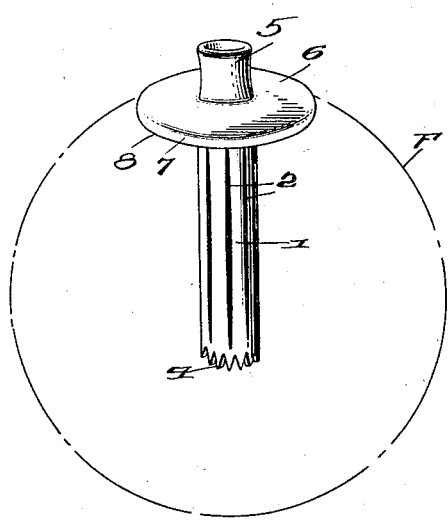
Fig. 1 is a perspective view of the extractor.
Figure 2:
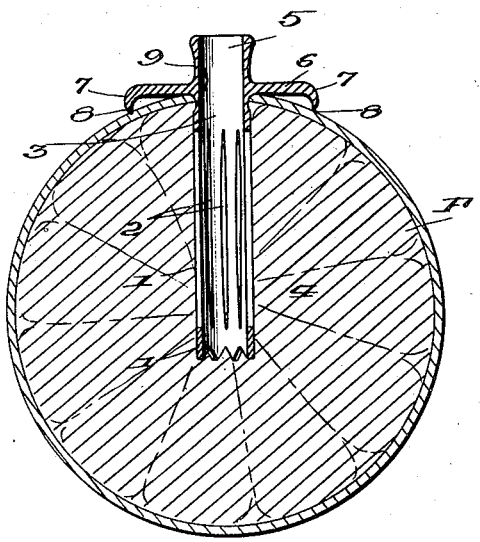
Fig. 2 is a sectional view through the same, illustrating it as applied to the fruit.

This tubular member 1 may have the lower end thereof opened as shown in Fig. 2 or closed, as desired, but it preferably has the extreme edge formed with a series of teeth 4, so as to cut into the skin and interior portion of the fruit F to facilitate the inserting of the tubular member 1 into the fruit.

Figure 3:
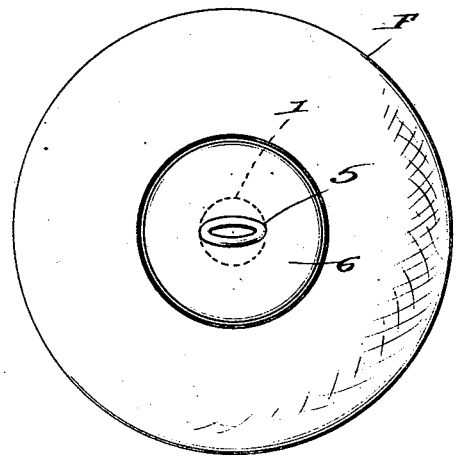
Fig 3 is a top view of the latter.
Figure 4:
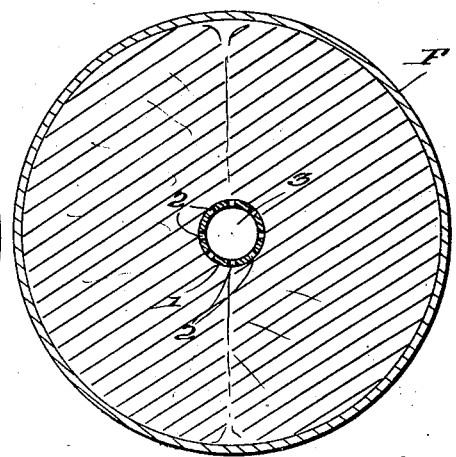
Fig. 4 is a transverse sectional view.

The upper end of the tubular member 1 terminates in a mouth-piece 5 formed oval in shape, as shown in Fig. 3, to receive the lips of the person using the same, as well as to prevent seeds from passing upwardly through the mouth piece.

A shoulder 6 is formed on the tubular member 1 just beneath the mouth-piece 5 and provided with a downturned flange 7 at the extreme outer edge thereof, provided with a sharpened edge 8, so as to dig into the skin of the fruit and to effectively close the space between the skin of the fruit and the shoulder 6.

The tubular member 1 is provided with an annular groove 9 immediately beneath the shoulder 1 to receive the skin of the fruit at this point. The purpose of this groove 9 and the shoulder 6 with its flange 7 is to effectively close the opening through the skin of the fruit, in which the tubular member is disposed and to create a vacuum beneath the shoulder 6 to prevent the ingress of air about the extractor.

In the use of the invention, the extractor is inserted into the skin of the fruit, an opening or hole being provided by the toothed edge 4 thereof, which likewise serves to cut into the edible interior or pulp of the fruit, and the extractor is inserted as far into the fruit as the shoulders 6 will permit. The sharpened edge 8 comes into contact with the skin of the fruit and to a slight extent may cut into the same, so as to effectively close the space between the shoulder 6 and the skin of the fruit, entirely enclosing the hole through which the extractor is inserted in the fruit. The edges of the skin around the hole naturally assume a position in the groove 9, which likewise facilitates a tight and close fit between the extractor and skin. Then by applying the lips to the mouth-piece 5 and sucking on the same, a vacuum is created within the pulp of the fruit which extracts the fruit juice through the slits or holes 2 and the central opening 3 out through the mouth-piece 5. This vacuum is maintained because of the closure of the opening about the extractor and the fact that a vacuum is created beneath the shoulder 6, which does not allow any air to enter the fruit from around the extractor, in this way maintaining the vacuum in the fruit and facilitating a withdrawal or sucking of the juice therefrom.

The invention is extremely simple and may be made of any suitable material, such as wood, metal, etc., and at a very small cost, but at the same time effectively allowing a sucking of the fruit juice from the fruit without allowing any of the juice to pass out through the skin except through the extractor. In this way, there is no danger of soiling the hands or clothes, and this is a thoroughly sanitary manner of extracting the juice from the fruit.

I claim:—

1. A fruit juice extractor including a tubular member having openings formed therein and adapted to be inserted into a fruit for extracting the juice therefrom by sucking, a mouth-piece formed on the outer end of said tubular member, and a shoulder carried by said tubular member and extending outwardly therefrom, said shoulder having a down-turned sharpened outer edge for engaging the skin of the fruit and closing the space beneath the shoulder, creating a vacuum therein and preventing the ingress of air into the fruit upon the sucking operation, said tubular member having a groove formed therein immediately beneath the shoulder to receive the edges of the skin of the fruit about the opening, and having a toothed inner end to cut into the fruit.

2. A fruit juice extractor including a stem adapted to be inserted into the fruit for withdrawal of the juice, said stem having a groove therein for receiving the edges of the fruit.

3. A fruit juice extractor including an enlarged stem provided with an enlarged opening approximately in the lower end thereof, and a mouth-piece attached to said stem and having an opening therethrough of substantially reduced size and area to prevent portions of the fruit from passing therethrough.

4. A fruit juice extractor including an enlarged stem provided with an enlarged opening in the inner end thereof to pass over a portion of the fruit, and a mouth-piece attached to said stem and having an opening therethrough of substantially reduced size and area to prevent portions of the fruit from passing therethrough.

5. A fruit juice extractor comprising a cylindrical stem having an enlarged opening in the lower end thereof to pass over a portion of the fruit in inserting the extractor, said stem terminating at its upper end in a mouth-piece having a constricted opening therethrough to permit the juice to pass through but to restrain the passage of seeds and the like.

6. A fruit juice extractor comprising a cylindrical stem having an unconstricted body portion with an enlarged opening therethrough and through the lower end to pass over a portion of the fruit in inserting the extractor, said stem terminating at its upper end in a mouthpiece having a substantially smaller constricted opening therethrough to permit the passage of juice but to restrain the passage of seeds or the like.

7. A fruit juice extractor comprising a stem adapted to be inserted into the fruit to extract the juice, and means arranged about the stem to extend about the edges of the fruit and to receive the edges.

8. A fruit juice extractor comprising a stem adapted to be inserted into the fruit to extract the juice, means arranged about the stem to embrace and receive the edges of the fruit, and a flange extending outwardly from the stem to overlap the fruit and the opening through which the stem was inserted.

In testimony whereof I affix my signature.

MARIE D. CODY.